(12) United States Patent
Kumeta

(10) Patent No.: US 11,480,826 B2
(45) Date of Patent: Oct. 25, 2022

(54) VEHICLE MIRROR

(71) Applicant: Ichikoh Industries, Ltd., Isehara (JP)

(72) Inventor: Masayuki Kumeta, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 81 days.

(21) Appl. No.: 17/046,897

(22) PCT Filed: Apr. 18, 2019

(86) PCT No.: PCT/JP2019/016568
§ 371 (c)(1),
(2) Date: Oct. 12, 2020

(87) PCT Pub. No.: WO2019/203294
PCT Pub. Date: Oct. 24, 2019

(65) Prior Publication Data
US 2021/0157202 A1    May 27, 2021

(30) Foreign Application Priority Data
Apr. 20, 2018  (JP) .............................. JP2018-081386

(51) Int. Cl.
*B60R 1/08*      (2006.01)
*G02F 1/1335*    (2006.01)
(Continued)

(52) U.S. Cl.
CPC ........ *G02F 1/133536* (2013.01); *B60R 1/088* (2013.01); *G02B 5/08* (2013.01); *G02F 1/1347* (2013.01)

(58) Field of Classification Search
None
See application file for complete search history.

(56) References Cited

U.S. PATENT DOCUMENTS

| 8,767,145 B1 | 7/2014 | Zhang |
| 2004/0100598 A1 | 5/2004 | Adachi et al. |

(Continued)

FOREIGN PATENT DOCUMENTS

| JP | 2001-318374 A | 11/2001 |
| JP | 2004-69926 A | 3/2004 |

(Continued)

OTHER PUBLICATIONS

International Search Report dated Jun. 9, 2019 in PCT/JP2019/016568 filed on Apr. 18, 2019, 2 pages.

*Primary Examiner* — Thanh Nhan P Nguyen
(74) *Attorney, Agent, or Firm* — Oblon, McClelland, Maier & Neustadt, L.L.P.

(57) ABSTRACT

A vehicle mirror includes: an image display section that displays an image with first polarized light; and a mirror section disposed on an image output side of the image display section, wherein, in order from the image display section side, the mirror section includes, for example, a first polarizer that transmits the first polarized light and reflects second polarized light, a polarization controller that controls a polarization state of light, and a second polarizer that transmits the first polarized light and absorbs the second polarized light, wherein the polarization controller includes a liquid crystal layer, a first electrode being set on a first polarizer side of the liquid crystal layer, and a second electrode being set on a second polarizer side of the liquid crystal layer, and wherein at least one of the first electrode and the second electrode is formed with multiple area electrodes.

8 Claims, 12 Drawing Sheets

(51) Int. Cl.
*G02B 5/08* (2006.01)
*G02F 1/1347* (2006.01)

(56) References Cited

U.S. PATENT DOCUMENTS

| | | |
|---|---|---|
| 2009/0002575 A1 | 1/2009 | Yamada et al. |
| 2015/0185562 A1 | 7/2015 | Baek et al. |
| 2017/0357112 A1 | 12/2017 | Shibahara et al. |

FOREIGN PATENT DOCUMENTS

| | | |
|---|---|---|
| JP | 2009-8881 A | 1/2009 |
| JP | 2017-47804 A | 3/2017 |
| WO | WO 2016/136100 A1 | 9/2016 |

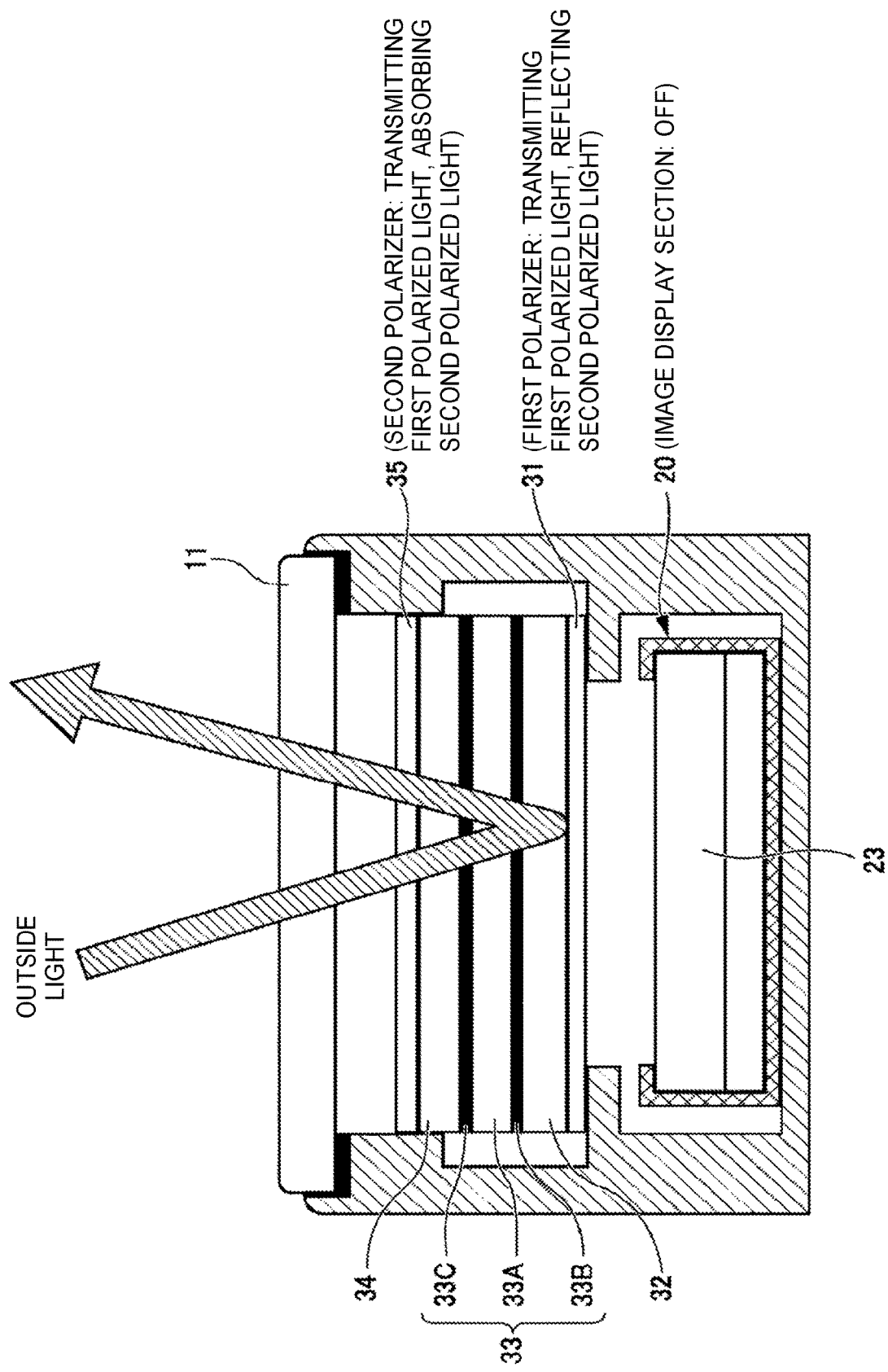

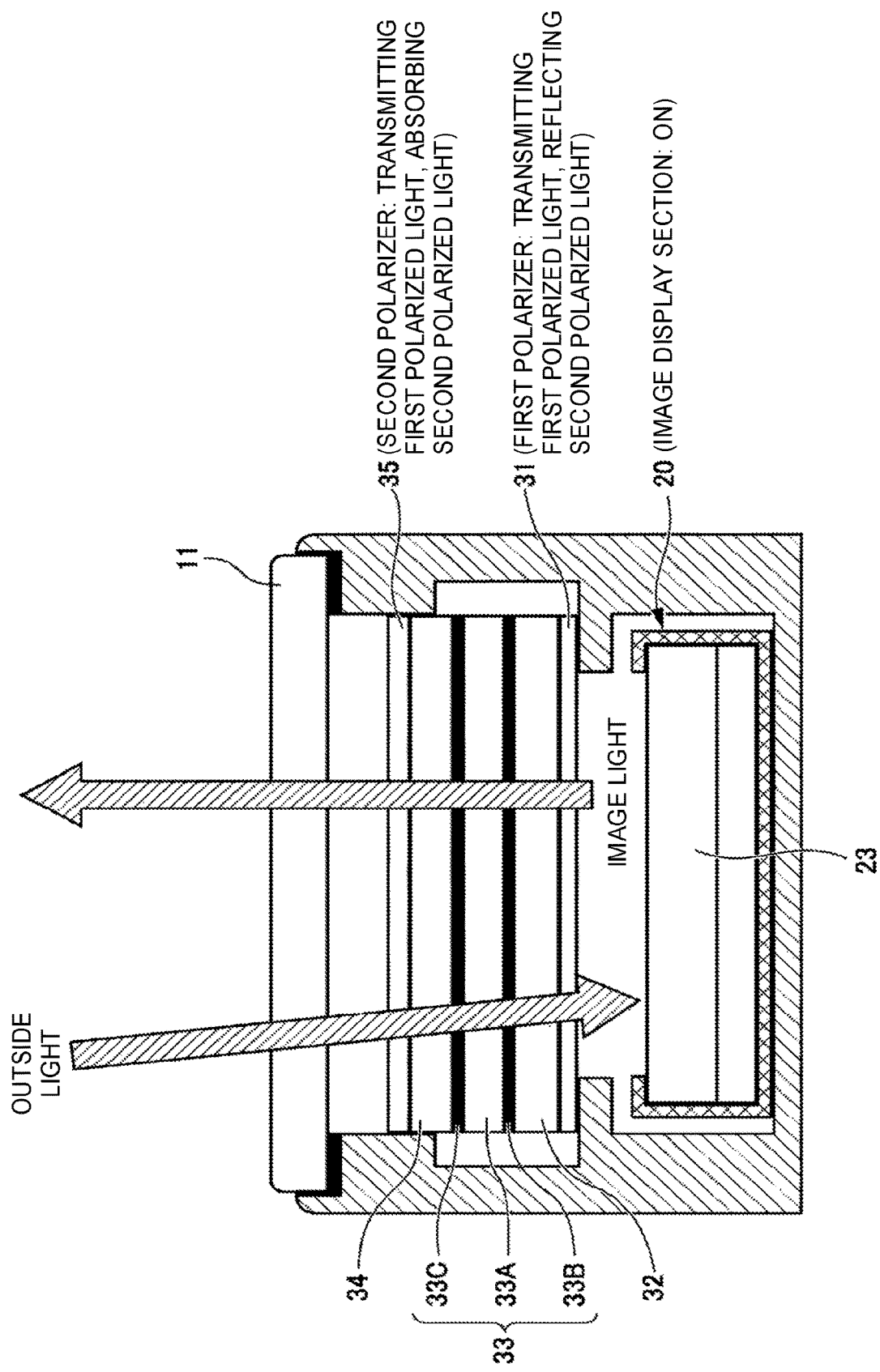

FIG. 6

| BACK-MONITOR DISPLAY | DISPLAY MODE | FIRST AREA B1 | | SECOND AREA B2 | |
|---|---|---|---|---|---|
| | | APPLICATION OF VOLTAGE TO LIQUID CRYSTAL LAYER | DISPLAY STATE OF IMAGE DISPLAY SECTION 20 | APPLICATION OF VOLTAGE TO LIQUID CRYSTAL LAYER | DISPLAY STATE OF IMAGE DISPLAY SECTION 20 |
| OFF | MIRROR MODE | 0(V) | BLACK | 0(V) | BLACK |
| | ANTI-GLARE MODE | VOLTAGE CONTROL ACCORDING TO LIGHT AMOUNT | BLACK | VOLTAGE CONTROL ACCORDING TO LIGHT AMOUNT | BLACK |
| | CAMERA MODE | MAXIMUM VOLTAGE | IMAGES OF ONBOARD CAMERA 1 | MAXIMUM VOLTAGE | IMAGES OF ONBOARD CAMERA 1 |
| ON (SECOND AREA B2) | MIRROR MODE | 0(V) | BLACK | MAXIMUM VOLTAGE | IMAGES OF ONBOARD CAMERA 2 |
| | ANTI-GLARE MODE | VOLTAGE CONTROL ACCORDING TO LIGHT AMOUNT | BLACK | MAXIMUM VOLTAGE | IMAGES OF ONBOARD CAMERA 2 |
| | CAMERA MODE | MAXIMUM VOLTAGE | IMAGES OF ONBOARD CAMERA 1 | MAXIMUM VOLTAGE | IMAGES OF ONBOARD CAMERA 2 |

FIG. 12

| BACK-MONITOR DISPLAY | DISPLAY MODE | FIRST AREA B1 | | SECOND AREA B2 | | THIRD AREA B3 | |
|---|---|---|---|---|---|---|---|
| | | APPLICATION OF VOLTAGE TO LIQUID CRYSTAL LAYER | DISPLAY STATE OF IMAGE DISPLAY SECTION 20 | APPLICATION OF VOLTAGE TO LIQUID CRYSTAL LAYER | DISPLAY STATE OF IMAGE DISPLAY SECTION 20 | APPLICATION OF VOLTAGE TO LIQUID CRYSTAL LAYER | DISPLAY STATE OF IMAGE DISPLAY SECTION 20 |
| OFF | MIRROR MODE | 0(V) | BLACK | 0(V) | BLACK | 0(V) | BLACK |
| | ANTI-GLARE MODE | VOLTAGE CONTROL ACCORDING TO LIGHT AMOUNT | BLACK | VOLTAGE CONTROL ACCORDING TO LIGHT AMOUNT | BLACK | VOLTAGE CONTROL ACCORDING TO LIGHT AMOUNT | BLACK |
| | CAMERA MODE | MAXIMUM VOLTAGE | IMAGES OF ONBOARD CAMERA 1 | MAXIMUM VOLTAGE | IMAGES OF ONBOARD CAMERA 1 | MAXIMUM VOLTAGE | IMAGES OF ONBOARD CAMERA 1 |
| ON (SECOND AREA B2) | MIRROR MODE | 0(V) | BLACK | MAXIMUM VOLTAGE | IMAGES OF ONBOARD CAMERA 2 | 0(V) | BLACK |
| | ANTI-GLARE MODE | VOLTAGE CONTROL ACCORDING TO LIGHT AMOUNT | BLACK | MAXIMUM VOLTAGE | IMAGES OF ONBOARD CAMERA 2 | VOLTAGE CONTROL ACCORDING TO LIGHT AMOUNT | BLACK |
| | CAMERA MODE | MAXIMUM VOLTAGE | IMAGES OF ONBOARD CAMERA 1 | MAXIMUM VOLTAGE | IMAGES OF ONBOARD CAMERA 2 | MAXIMUM VOLTAGE | IMAGES OF ONBOARD CAMERA 1 |
| ON (THIRD AREA B3) | MIRROR MODE | 0(V) | BLACK | 0(V) | BLACK | MAXIMUM VOLTAGE | IMAGES OF ONBOARD CAMERA 2 |
| | ANTI-GLARE MODE | VOLTAGE CONTROL ACCORDING TO LIGHT AMOUNT | BLACK | VOLTAGE CONTROL ACCORDING TO LIGHT AMOUNT | BLACK | MAXIMUM VOLTAGE | IMAGES OF ONBOARD CAMERA 2 |
| | CAMERA MODE | MAXIMUM VOLTAGE | IMAGES OF ONBOARD CAMERA 1 | MAXIMUM VOLTAGE | IMAGES OF ONBOARD CAMERA 1 | MAXIMUM VOLTAGE | IMAGES OF ONBOARD CAMERA 2 |

VEHICLE MIRROR

TECHNICAL FIELD

The present invention relates to a vehicle mirror.

BACKGROUND ART

PTL 1 discloses an electronic mirror which is a mirror device for a vehicle, and the electronic mirror is provided with a mirror function for making it possible to visually recognize the rear of the vehicle and a display function for displaying various kinds of information.

Specifically, the mirror device includes a half mirror and a display panel in that order from the front surface side, which is viewed by the driver.

Furthermore, the mirror device also includes a first light amount sensor that is installed to a position above the half mirror, so that, by use of characteristics of human eyes, that is, adaptation and simultaneous contrast, the mirror device realizes an anti-glare function by turning on the backlight of the display panel in a case where the light amount of the outside light detected by the first light amount sensor is equal to or greater than a predetermined first threshold value, in order to prevent the driver from being dazzled by reflected light of the headlight of a following vehicle.

On the other hand, PTL 2 discloses a device capable of switching between an image display status and a mirror status, the device including an image display portion that emits image light for displaying a desired image and a mirror function portion that is superposed on the image display portion and is capable of being switched between an image transmittance state that transmits the image light and a mirror status that reflects outside light, the mirror function portion including reflective polarization selection means, transmission polarization axis variable means, and absorbing polarization selection means successively disposed from the image display portion side, with the reflective polarization selection means transmitting a first polarization of a predetermined polarization axis and reflecting a second polarization whose polarization axis intersects that of the first polarization, the transmission polarization axis variable means being capable of switching between a state that transmits by changing the incident first polarization to the second polarization and a state that transmits without changing the polarization axis of the incident light, and the absorbing polarization selection means transmitting one of the first polarization and the second polarization and absorbing the other, and the image display portion being disposed with image light-use polarization selection means that transmits the first polarization and absorbs the second polarization, the image display portion emitting, as the image light, the first polarization transmitted through the image light-use polarization selection means.

CITATION LIST

Patent Literature

PTL 1: Japanese Unexamined Patent Application Publication No. 2017-47804
PTL 2: Japanese Unexamined Patent Application Publication No. 2001-318374

SUMMARY OF THE INVENTION

Problems to Be Solved By the Invention

By the way, in a case where the reflectivity and transmittance of the half mirror are 50%, the half mirror has a characteristic that reflects, not only the light traveling toward the half mirror from the front side, but also the light traveling toward the half mirror from the back side by the reflectance of 50%.

For this reason, in the configuration of PTL 1, there is a problem that, since about a half of the light amount of the image light (including the through-the-lens images being captured by a camera) displayed on the display panel is reflected by the half mirror toward the display panel side, the light amount of the image light to be seen by the driver via the half mirror becomes about a half of the image light displayed on the display panel, which results in a dark image.

On the other hand, in the case of the configuration of PTL 2, since such a member as the half mirror is not used, it is considered to be possible to avoid the problem that the image becomes dark if the configuration of the electronic mirror of the PTL 1 is replaced with the configuration of PTL 2.

Furthermore, regarding the mirror function portion that is capable of being switched between an image transmittance state that transmits the image light and a mirror status that reflects outside light in the configuration of PTL 2, since it is estimated that the light amount reflected by the reflective polarization selection means can be adjusted by adjusting the amount of changing the light polarization axis of the transmission polarization axis variable means, it is expected that the anti-glare function can be realized even in a case where the configuration of PTL 1 is replaced with the configuration of PTL 2.

However, in a case where the configuration of PTL 1 is replaced with the configuration of PTL 2, if the amount of changing the light polarization axis of the transmission polarization axis variable means is adjusted, the amount of light that can be transmitted by the mirror function portion from the image display portion side is to be changed according to the adjustment.

For this reason, in consideration of the case of keeping the almost entire vehicle mirror to function as a mirror having an anti-glare function and displaying an image (for example, a through-the-lens image, etc., being captured by a camera, etc.) of the image display portion on a part within the mirror, in this case, there occurs a problem that brightness of the image changes according to adjustment of the amount of changing the light polarization axis of the transmission polarization axis variable means.

Therefore, one of the objects of the present disclosure is to provide a vehicle mirror capable of reducing brightness change of an image even in a case of keeping the almost entire vehicle mirror to function as a mirror having an anti-glare function and displaying, for example, an image (through-the-lens image, etc.) being captured by a camera, etc., on a part within the mirror.

Means for Solving the Problem

According to an aspect of the present disclosure, it is possible to provide a vehicle mirror capable of displaying an image, the vehicle mirror including: an image display section configured to display an image with first polarized light; and a mirror section disposed on an image output side of the image display section, wherein, in order from a side of the image display section, the mirror section includes a first polarizer configured to transmit at least one of the first polarized light and second polarized light and reflect the other light, a polarization controller configured to control a polarization state of light, and a second polarizer configured to transmit the first polarized light and absorb the second polarized light, wherein the polarization controller includes a liquid crystal layer, a first electrode that is set on a first polarizer side of the liquid crystal layer, and a second electrode that is set on a second polarizer side of the liquid crystal layer, and wherein at least one of the first electrode and the second electrode is formed with a plurality of area electrodes.

Effect of the Invention

According to the present disclosure, it is possible to obtain a vehicle mirror capable of reducing brightness change of an image even in a case of keeping the almost entire vehicle mirror to function as a mirror having an anti-glare function and displaying, for example, an image (through-the-lens image, etc.) being captured by a camera, etc., on a part within the mirror.

BRIEF DESCRIPTION OF THE DRAWINGS

FIG. 4 is a diagram for explaining operation of the vehicle mirror of the first embodiment being in a whole mirror state.

FIG. 5 is a diagram for explaining operation of the vehicle mirror of the first embodiment being in a whole camera state.

FIG. 6 is a table summarizing the operation states of the first embodiment.

FIG. 12 is a table summarizing the operation states of the second embodiment.

MODE FOR CARRYING OUT THE INVENTION

Figure 1:
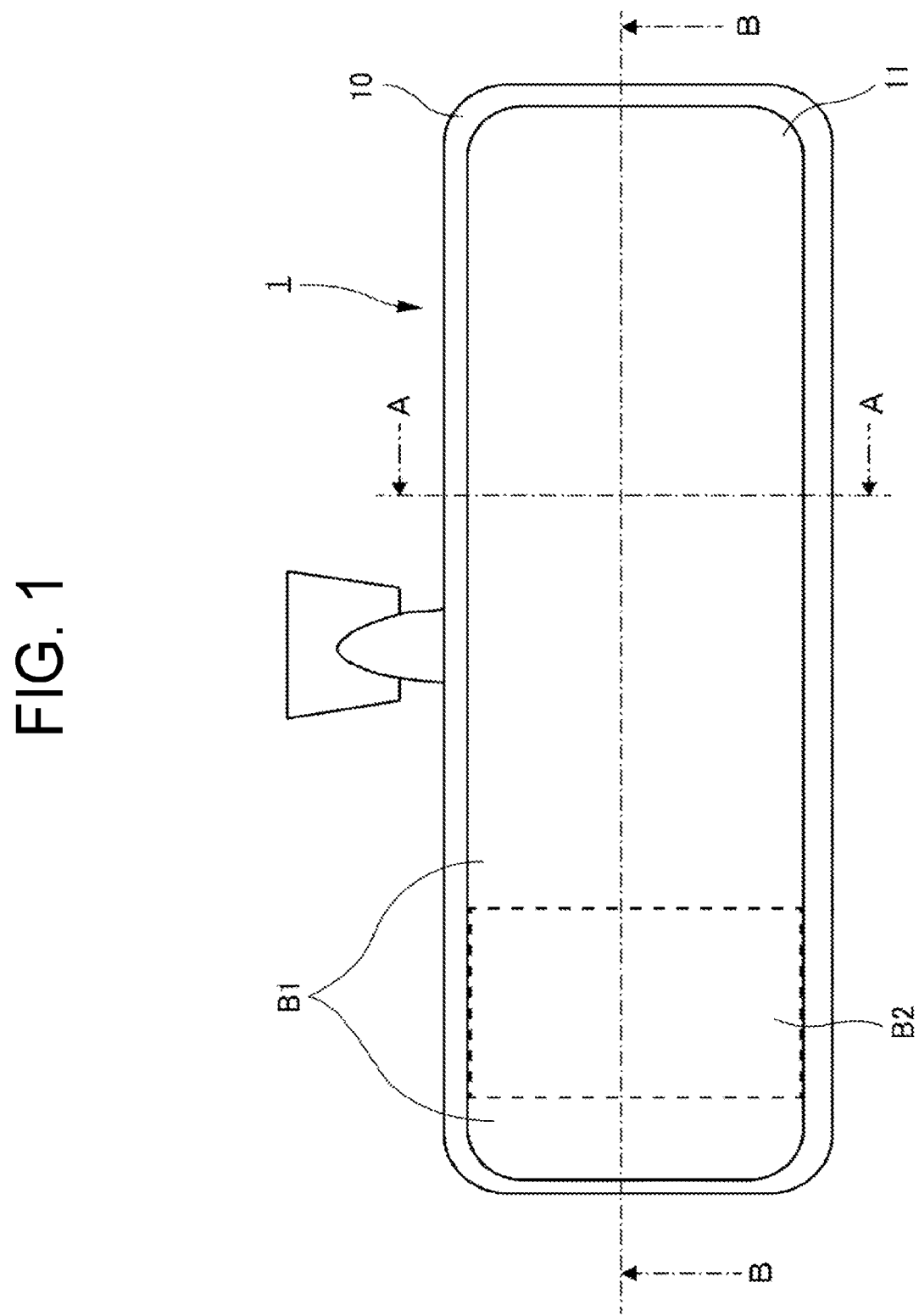
FIG. 1 is a plan view of a vehicle mirror of the first embodiment.

Hereinafter, with reference to the accompanying drawings, detailed explanations are given of embodiments.

Note that the same numbers or reference numerals are given to the same elements throughout the entire explanation of the embodiments.

First Embodiment

Figure 2:
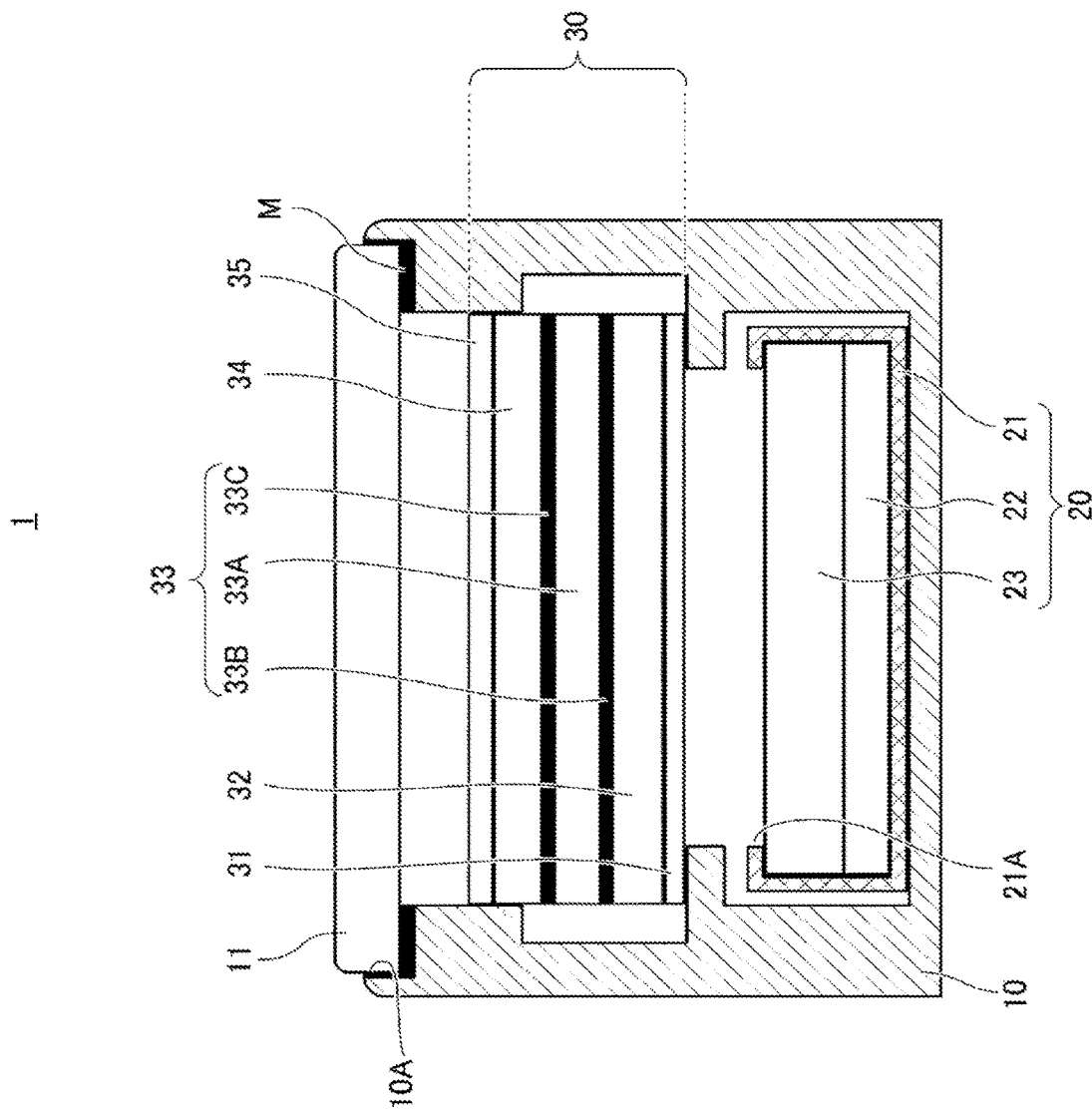
FIG. 2 is a schematic view illustrating the cross section taken along Line A-A of FIG. 1.
Figure 3:
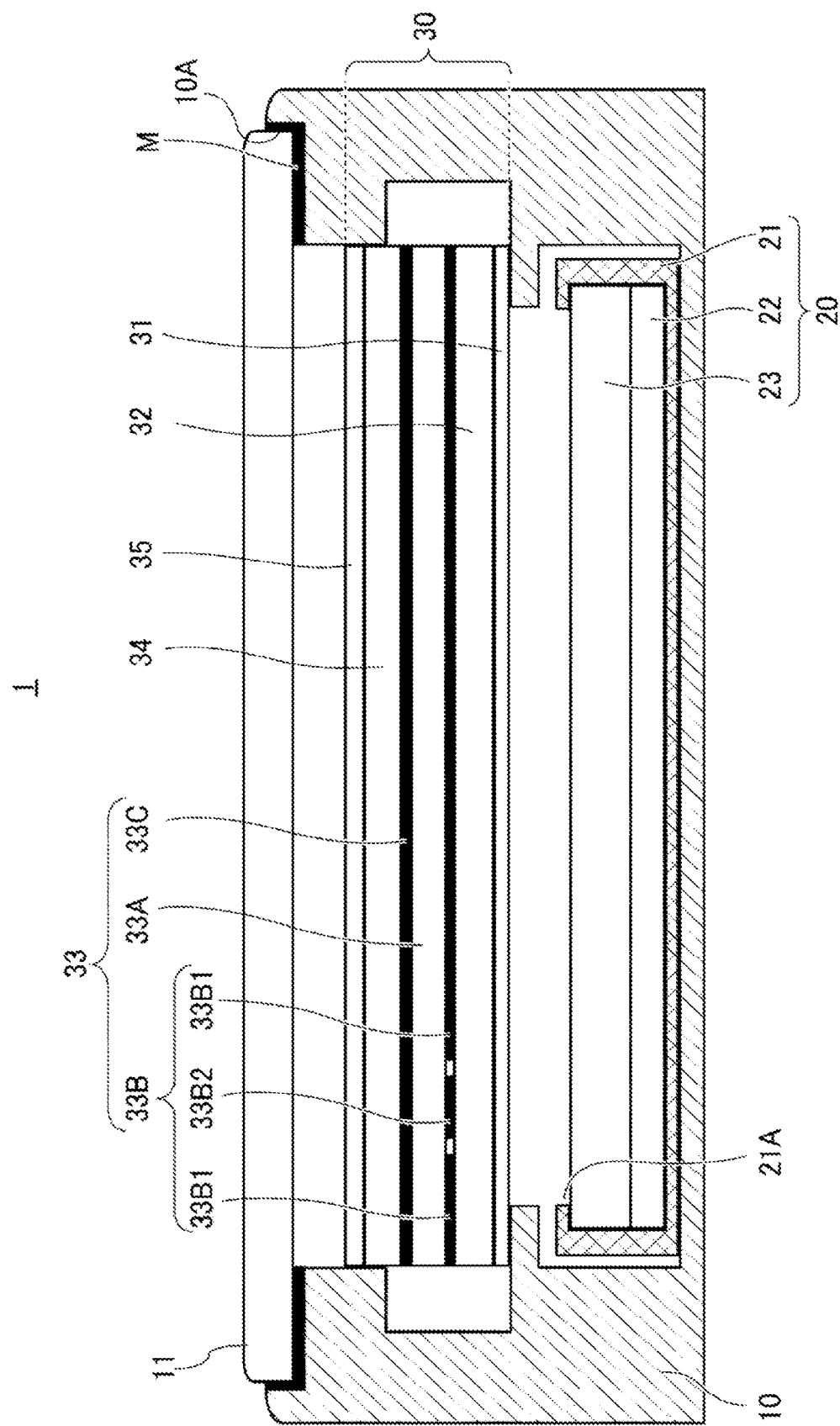
FIG. 3 is a schematic view illustrating the cross section taken along Line B-B of FIG. 1.

FIG. 1 is a plan view of the vehicle mirror 1 of the first embodiment, FIG. 2 is a schematic view illustrating the cross section taken along Line A-A of FIG. 1, and FIG. 3 is a schematic view illustrating the cross section taken along Line B-B of FIG. 1.

Note that, although a rear-view mirror installed inside a vehicle is illustrated as the vehicle mirror 1 in the present embodiment, the vehicle mirror 1 can be a wing mirror, etc., that is installed outside the vehicle.

Furthermore, as will be described later, the onboard camera C1 and the onboard camera C2 are mounted on the vehicle of the present embodiment.

As illustrated in FIG. 2 and FIG. 3, the vehicle mirror 1 includes a housing 10, a transparent cover 11 that is attached so as to cover the opening 10A of the housing 10, an image display section 20 that is accommodated in the housing 10, and a mirror section 30 that is disposed on the image output side (the upper side in FIG. 2 and FIG. 3) of the image display section 20 and accommodated in the housing 10.

(Housing 10)

The housing 10 is a part that accommodates each of the members explained below and forms the external appearance of the vehicle mirror 1.

Additionally, although the housing 10 is illustrated as an integrated form in FIG. 2 and FIG. 3, the housing 10 need not be limited to such an integrated form, and it is also possible that the housing 10 can be separated into multiple parts in the viewpoint of molding or in the viewpoint of accommodating the image display section 20 and the mirror section 30.

(Image Display Section 20)

The image display section 20 is a part that displays images (through-the-lens images), etc., of the onboard camera C1 and the onboard camera C2 that are mounted on the rear of the vehicle, and the image display section 20 is what is termed as a liquid crystal display device including a case 21 having an opening 21A capable of outputting an image to the image output side (the upper side of FIG. 2 and FIG. 3), a control board 22 disposed on the bottom side (the lower side of FIG. 2 and FIG. 3) inside the case 21, and a liquid crystal monitor 23 disposed on the opening 21A side of the control board 22.

Note that, needless to say, it is possible that, as described later, the image display section 20 displays a warning and the like as necessary in addition to displaying images (through-the-lens images) of the onboard camera C1 and the onboard camera C2.

The control board 22 is a control section that entirely controls the vehicle mirror 1, that is, the control board 22 controls the mirror section 30 as described later, in addition to controlling how and on which part of the liquid crystal monitor 23 (the entire surface, a predetermined part as described later, or the like) images (through-the-lens images) of the onboard camera C1 and the onboard camera C2 are displayed.

The liquid crystal monitor 23 can be a generally-known liquid crystal monitor, and, for example, includes a back light and a color liquid crystal display section disposed on the light output side of the back light, and the color liquid crystal display section includes, in order from the back light side, a back side polarizer, a back side glass substrate, a liquid crystal layer, an RGB color filter, a front side glass substrate, and a front side polarizer.

Furthermore, the color liquid crystal display section includes multiple pixel electrodes, which are disposed on the surface of the back side glass substrate facing the liquid crystal layer and formed for the respective sub pixels corresponding to RGB that are included in each pixel of the color filter, and one counter electrode (also referred to as a common electrode), which is disposed on the surface of the color filter facing the liquid crystal layer and formed so as to correspond to the entire liquid crystal layer.

Note that, needless to say, the pixel electrodes and the counter electrode are transparent electrodes made of a transparent electrode material such as ITO, and, for example, each of the pixel electrodes has a thin-film transistor (TFT) that is controlled by an address line and a data line, so that application of a voltage to a pixel electrode is individually controlled.

Further, for example, the color liquid crystal display section keeps the voltage of the counter electrode constant and controls the voltages of the pixel electrodes so as to correspond to the image to be output, in order to transmit or block the light from the backlight for each sub pixel, so that a color image is displayed.

In this way, since the color liquid crystal display section controls the output of image light based on the principle of a liquid crystal shutter, the light corresponding to the sub pixels that form the image is polarized, and the light is herein referred to as first polarized light.

Therefore, the image display section 20 is configured to display an image with first polarized light.

In addition, the first polarized light that appears in the following explanation means the light in the same polarization state as that of the light output from the color liquid crystal display section, and the light polarized perpendicularly to the first polarized light is referred to as second polarized light.

Note that the light output from the color liquid crystal display section of the present embodiment is P-polarized light, and therefore, in the present embodiment, the first polarized light is P-polarized light and the second polarized light is S-polarized light.

However, depending on the type of color liquid crystal display section, the output light may be S-polarized light, and, in that case, the first polarized light is S-polarized light and the second polarized light is P-polarized light.

(Mirror Section 30)

As illustrated in FIG. 2, in order from the image display section 20 side, the mirror section 30 includes a first polarizer 31 that is configured to transmit the first polarized light (P-polarized light) and reflect the second polarized light (S-polarized light), a transparent glass substrate 32 having the first polarizer 31 on the surface facing the image display section 20, a polarization controller 33 that is configured to control the polarization state of light, a transparent glass substrate 34, and a second polarizer 35 that is disposed on the surface of the glass substrate 34 facing the image output side (the upper side in FIG. 2) and is configured to transmit the first polarized light (P-polarized light) and absorb the second polarized light (S-polarized light).

Note that the first polarizer 31 and the second polarizer 35 need not necessarily be formed of a plate material having high rigidity and may be formed of a film material having low rigidity, and, in the present embodiment, film-shaped ones are used for the first polarizer 31 and the second polarizer 35.

As illustrated in FIG. 2, the polarization controller 33 includes a liquid crystal layer 33A, a first electrode 33B that is disposed on the first polarizer 31 side of the liquid crystal layer 33A, and a second electrode 33C that is disposed on the second polarizer 35 side of the liquid crystal layer 33A.

Here, in the present embodiment, as illustrated in FIG. 1, the region that functions as a mirror except for a mirror-finished fixed mirror section M that is formed by silver-colored vapor deposition or coating so as to always function as a mirror (hereinafter simply described as the region that functions as a mirror) is divided into a first area B1 and a second area B2, and, as illustrated in FIG. 3, the first electrode 33B is formed with multiple area electrodes corresponding to the first area B1 and the second area B2.

It should be noted that the mirror finish of the fixed mirror section M is applied to the surface facing the side of the cover 11 to be received by the housing 10, and the mirror finish means a finish that is capable of reflecting light as a mirror and need not be formed by vapor deposition or coating as described above.

Specifically, in the present embodiment, since the region that functions as a mirror is divided into two areas, that is, the first area B1 and the second area B2, the first electrode 33B is formed with two area electrodes, that is, a first area electrode 33B1 that is set for the region corresponding to the first area B1 and a second area electrode 33B2 that is set for the region corresponding to the second area B2.

Specifically, the first area electrode 33B1 and the second area electrode 33B2 are formed on the surface of the glass substrate 32 facing the liquid crystal layer 33A by use of a transparent electrode material such as ITO On the other hand, as illustrated in FIG. 3, the second electrode 33C is formed with one common electrode that is disposed over the whole region that functions as a mirror (the whole liquid crystal layer 33A), and, specifically, the common electrode is formed on the surface of the glass substrate 34 facing the liquid crystal layer 33A by use of a transparent electrode material such as ITO.

However, as will be described in the following explanation, it is also possible that the second electrode 33C is also formed with a common electrode that is set for the region corresponding to the first area B1 and a common electrode that is set for the region corresponding to the second area B2, since there is no problem as long as the voltage to be applied to the liquid crystal molecules of the liquid crystal layer 33A corresponding to the first area B1 and the voltage to be applied to the liquid crystal molecules of the liquid crystal layer 33A corresponding to the second area B2 can be separately controlled and the alignment direction of the liquid crystal molecules of the liquid crystal layer 33A corresponding to the first area B1 and the alignment direction of the liquid crystal molecules of the liquid crystal layer 33A corresponding to the second area B2 can be separately controlled.

Note that it is also possible that the first electrode 33B is formed with one common electrode that is set for the whole region that functions as a mirror (the whole liquid crystal layer 33A) and that the second electrode 33C is formed with a first area electrode that is set for the region corresponding to the first area B1 and a second area electrode that is set for the region corresponding to the second area B2, since, as described above, there is no problem as long as the voltage to be applied to the liquid crystal molecules of the liquid crystal layer 33A corresponding to the first area B1 and the voltage to be applied to the liquid crystal molecules of the liquid crystal layer 33A corresponding to the second area B2 can be separately controlled.

Additionally, even in that case, it is also possible that the first electrode 33B, which is the common electrode, is formed with multiple common electrodes (in the present example, two common electrodes) that respectively correspond to the first area B1 and the second area B2.

As described above, regarding the first electrode 33B and the second electrode 33C, it is only needed that, according to the number of areas that are set for the region that functions as a mirror, at least one of the first electrode 33B and the second electrode 33C is formed with multiple area electrodes corresponding to the areas, and the other one that is not formed with area electrodes is formed with one common electrode or multiple common electrodes corresponding to the areas.

Although the operation of the vehicle mirror 1 configured as described above will be explained in detail in the following description, it is considered to be easier to understand the cases of separately using the first area B1 and the second area B2 if such cases are explained after understanding the overall operation first.

For this reason, firstly, explanations are given of the case of using the whole region that functions as a mirror in a mirror mode in which the whole region that functions as a mirror is simply used as a mirror (also referred to as the whole mirror state), the case of using the whole region that functions as a mirror in an anti-glare mode for preventing the driver from being dazzled due to reflected light of the headlight of a following vehicle (also referred to as the whole anti-glare mirror state), and the case of using the whole region that functions as a mirror in a camera mode for displaying images (through-the-lens images), etc., of the onboard camera C1, which is mounted on the rear of the vehicle, so as to display images (through-the-lens images), etc., of the rear of the vehicle that is widely captured (also referred to as the whole camera state).

Note that, in the whole camera state which is firstly explained, the images (through-the-lens images) of the onboard camera C1 are to be displayed, even though, in the present embodiment, the vehicle is provided with the onboard camera C1 for widely capturing images of the rear of the vehicle and the onboard camera C2 for capturing images of, for example, the lower region that is hidden below the rear window, which is in the rear of the vehicle, and the images (through-the-lens images) of the onboard camera C1 and the onboard camera C2 are to be displayed respectively on the first area B1 and the second area B2.

Furthermore, regarding the whole mirror state, the whole anti-glare mirror state, and the whole camera state, although the control by the polarization controller 33 is performed in accordance with the respective states, the voltage V1 for the first electrode 33B (the first area electrode 33B1 and the second area electrode 33B2) and the voltage V2 for the second electrode 33C are controlled to be approximately even for the whole region that functions as a mirror (the whole liquid crystal layer 33A), since the whole region that functions as a mirror is operated to be in the same state.

That is, it is only needed that the voltage V21 for the first area electrode 33B1 and the voltage V22 for the second area electrode 33B2 are controlled to be the same voltage V2, and, for simplification of the explanation, the voltage V21 and the voltage V22 for the first area electrode 33B1 and the second area electrode 33B2 are collectively termed as the voltage V2 for the second electrode 33C.

(Whole Mirror State)

FIG. 4 is a diagram for explaining the operation of the vehicle mirror 1 of the present embodiment being in the whole mirror state, and, although the text descriptions, etc., are given for ease of explanation, FIG. 4 is basically the same diagram as FIG. 2.

First, in a case where no voltage is applied to the liquid crystal layer 33A, that is, in a case where the voltage V1 for the first electrode 33B and the voltage V2 for the second electrode 33C are the same voltage and therefore the voltage difference ΔV is 0(V), the alignment direction of the liquid crystal molecules in the liquid crystal layer 33A does not change.

In this case, if the light entering the liquid crystal layer 33A is second polarized light (S-polarized light), the light becomes first polarized light (P-polarized light) when exiting from the liquid crystal layer 33A, and, conversely, if the light entering the liquid crystal layer 33A is first polarized light (P-polarized light), the light becomes second polarized light (S-polarized light) when exiting from the liquid crystal layer 33A.

Note that, hereinafter, this voltage difference ΔV is also referred to as the voltage ΔV applied to the liquid crystal layer 33A.

On the other hand, as the voltage ΔV applied to the liquid crystal layer 33A increases, the alignment direction of the liquid crystal molecules in the liquid crystal layer 33A changes, and, when the voltage ΔV applied to the liquid crystal layer 33A is maximum, the liquid crystal layer 33A stops exhibiting the function of changing the polarization state of light.

That is, when the voltage ΔV applied to the liquid crystal layer 33A is maximum, if the light entering the liquid crystal layer 33A is second polarized light (S-polarized light), the light exiting from the liquid crystal layer 33A is also second polarized light (S-polarized light), and, similarly, if the light entering the liquid crystal layer 33A is first polarized light (P-polarized light), the light exiting from the liquid crystal layer 33A is also first polarized light (P-polarized light).

Note that, in a case where the light entering the liquid crystal layer 33A is second polarized light (S-polarized light), the proportion of the light that is second polarized light (S-polarized light) when exiting from the liquid crystal layer 33A increases with increase of the voltage ΔV applied to the liquid crystal layer 33A.

Furthermore, similarly, in a case where the light entering the liquid crystal layer 33A is first polarized light (P-polarized light), the proportion of the light that is first polarized light (P-polarized light) when exiting from the liquid crystal layer 33A increases with increase of the voltage ΔV applied to the liquid crystal layer 33A.

Then, in the whole mirror state, the voltage V1 for the first electrode 33B and the voltage V2 for the second electrode 33C are controlled so that the voltage ΔV applied to the liquid crystal layer 33A becomes 0(V).

For example, the voltage V1 for the first electrode 33B is controlled to be 0(V) and the voltage V2 for the second electrode 33C is controlled to be 0(V).

Note that, needless to say, there is no problem even in a case where the voltage V1 for the first electrode 33B is controlled to be 5(V) and the voltage V2 for the second electrode 33C is controlled to be 5(V), since the voltage ΔV applied to the liquid crystal layer 33A becomes 0(V).

Here, since outside light contains first polarized light (P-polarized light) and second polarized light (S-polarized light) at almost the same ratio, as illustrated in FIG. 4, regarding the incident outside light that has passed through the cover 11, the second polarized light (S-polarized light) is absorbed by the second polarizer 35 and only the first polarized light (P-polarized light) passes through the second polarizer 35.

Further, the first polarized light (P-polarized light) that has passed through the second polarizer 35 enters the glass substrate 34, but, since the glass substrate 34 does not have the function of changing the polarization state, the first polarized light (P-polarized light) remains the first polarized light (P-polarized light) to enter the following liquid crystal layer 33A.

Here, as explained above, in the whole mirror state, the voltage ΔV applied to the liquid crystal layer 33A is 0(V), and, in this state, the polarization state changes in the process of passing through the liquid crystal layer 33A and therefore the first polarized light (P-polarized light) changes to the second polarized light (S-polarized light) when exiting from the liquid crystal layer 33A, so that the first polarized light (P-polarized light) becomes the second polarized light (S-polarized light) when reaching the first polarizer 31.

Therefore, the light is reflected by the first polarizer 31 and enters the liquid crystal layer 33A again, but the polarization state changes in the process of passing through the liquid crystal layer 33A here as well, so that the light becomes the first polarized light (P-polarized light) when exiting from the liquid crystal layer 33A.

Therefore, the light that has exited from the liquid crystal layer 33A passes through the glass substrate 34 and then further passes through the second polarizer 35, so as to be emitted to the outside of the vehicle mirror 1 via the cover 11.

In this way, in the whole mirror state, the function as a mirror is accomplished since the first polarized light (P-polarized light) of outside light is reflected.

In the meantime, in the whole mirror state, since the image display section 20 is not used, the image display section 20 is turned off (backlight off) and the display state of the liquid crystal monitor 23 is black.

(Whole Anti-Glare Mirror State)

As with the case of the whole mirror state, since the image display section 20 is not used in the whole anti-glare mirror state, the image display section 20 is turned off (backlight off) and the display state of the liquid crystal monitor 23 is black.

On the other hand, in the whole anti-glare mirror state, in order to prevent the driver from being dazzled by reflected light of the headlight of a following vehicle, the first polarized light (P-polarized light) that passes through the second polarizer 35 is not entirely emitted to the outside of the vehicle mirror 1 like the case of the whole mirror state.

More specifically, in the present embodiment, the vehicle mirror 1 is provided with a light amount sensor disposed at a position which is other than the position of the cover 11 and is capable of measuring the light amount of light being emitted toward the vehicle mirror 1 from the headlight of a following vehicle, so as to perform such control for adjusting the voltage ΔV to be applied to the liquid crystal layer 33A according to the light amount (the intensity of the light) detected by the light amount sensor.

Noted that it is also possible that the detection of the light amount of light emitted to the vehicle is performed based on an image captured by the onboard camera C1, so as to omit the light amount sensor.

For example, in a case where the light amount of outside light entering the vehicle mirror 1 is large since the light amount of light being emitted from the headlight of a following vehicle toward the vehicle mirror 1 is large, the voltage ΔV to be applied to the liquid crystal layer 33A is controlled to become large.

Then, as explained with the whole mirror state, the liquid crystal layer 33A stops exhibiting the function of changing the polarization state of light with increase in the voltage ΔV to be applied to the liquid crystal layer 33A, and therefore, in this case, a part of the light reaching the first polarizer 31 is reflected and the other part passes through the first polarizer 31 to travel toward the image display section 20, although most of the light that has reached the first polarizer 31 is reflected in the whole mirror state.

Further, since there is no light-reflecting structure on the image display section 20 side, the light that has passed through the first polarizer 31 and traveled toward the image display section 20 side does not return to the first polarizer 31 side any more.

Furthermore, even the second polarized light (S-polarized light) reflected by the first polarizer 31 to enter the liquid crystal layer 33A again partially changes the polarization state to the first polarized light (P-polarized light) in the process of passing through the liquid crystal layer 33A, so that only the light that has changed the polarization state to the first polarized light (P-polarized light) passes through the second polarizer 35 to be emitted to the outside of the vehicle mirror 1 via the cover 11.

As described above, in the whole anti-glare mirror state, a part of the first polarized light (P-polarized light) of the outside light that has passed through the second polarizer 35 is reflected and emitted to the outside of the vehicle mirror 1, so that the light amount of light emitted to the outside of the vehicle mirror 1 is reduced and therefore it is possible to prevent the driver from being dazzled.

Noted that, if the light amount of light emitted from the vehicle mirror 1 to the outside is attenuated too much, the function as a mirror will not be accomplished, so, needless to say, the voltage ΔV to be applied to the liquid crystal layer 33A is controlled so as to prevent the driver from being dazzled and, at the same time, allow an enough amount of light for accomplishing the function as a mirror to be emitted from the vehicle mirror 1 to the outside.

(Whole Camera State)

FIG. 5 is a diagram for explaining the operation of the vehicle mirror 1 of the present embodiment being in the whole camera state, and, although the text descriptions, etc., are given for ease of explanation, FIG. 5 is basically the same diagram as FIG. 2.

Since the whole camera state is a state in which the whole region that functions as a mirror is made to function as a monitor, the image display section 20 is turned on (the backlight on), and images (through-the-lens images) of the onboard camera C1 that widely captures the rear of the vehicle is displayed on the whole liquid crystal monitor 23.

Then, as expected from the above explanation, in the whole camera state, the voltage ΔV applied to the liquid crystal layer 33A is controlled to be maximum, so that the liquid crystal layer 33A stops exhibiting the function of changing the polarization state of light.

Then, as explained above, since the image display section 20 displays an image with first polarized light (P-polarized light), the light of an image (also referred to as image light) from the image display section 20 passes through the first polarizer 31 and enters the liquid crystal layer 33A, but, since the polarization state does not change here as well, the light of an image remains the first polarized light (P-polarized light) to enter the glass substrate 34.

Furthermore, since the glass substrate 34 does not change the polarization state as well, the image light remains the first polarized light (P-polarized light) to reach the second polarizer 35 and passes through the second polarizer 35 to be emitted to the outside of the vehicle mirror 1 via the cover 11.

Needless to say, although each member absorbs some light, the image light from the image display section 20 is almost entirely emitted to the outside of the vehicle mirror 1 except for the absorbed light, so that it is possible for the driver to see a clear image.

On the other hand, since the outside light entering the vehicle mirror 1 travels toward the image display section 20 side without being reflected by the first polarizer 31 as in the cases of the above-described whole mirror state and whole anti-glare mirror state, the outside light will not be emitted from the vehicle mirror 1 to the outside any more.

Next, explanations are given of the case of displaying images (through-the-lens images) of the onboard camera C2 on the second area B2 and using the first area B1 in a mirror mode in which the first area B1 is simply used as a mirror (also referred to as a partial mirror state), the case of displaying images (through-the-lens images) of the onboard camera C2 on the second area B2 and using the first area B1 in an anti-glare mode (also referred to as a partial anti-glare mirror state), and the case of displaying images (through-the-lens images) of the onboard camera C2 on the second area B2 and displaying images (through-the-lens images) of the onboard camera C1 on the first area B1 (also referred to as a 2-screen camera state).

Since images (through-the-lens images) of the onboard camera C2 are always displayed on the second area B2 in the cases of the partial mirror state, the partial anti-glare mirror state, and the 2-screen camera state, it is necessary that the second area B2 is in such a state where the image light from the image display section 20 is emitted to the outside of the vehicle mirror 1 as in the above-described whole camera state.

Therefore, the voltage ΔV2 applied to the part of the liquid crystal layer 33A corresponding to the region of the second area B2, that is, the voltage difference ΔV2 between the voltage V1 for the first electrode 33B and the voltage V22 for the second area electrode 33B2 is controlled to be maximum in any of the cases of the partial mirror state, the partial anti-glare mirror state, and the 2-screen camera state.

Needless to say, regarding the image display section 20, since the image light corresponding to images (through-the-lens images) of the onboard camera C2 is emitted toward the first polarizer 31 from the region corresponding to the second area B2, the backlight is in an ON-state (turned on).

(Partial Mirror State)

Additionally, in the partial mirror state, in order to make the first area B1 simply function as a mirror, the voltage ΔV1 applied to the part of the liquid crystal layer 33A corresponding to the region of the first area B1, that is, the voltage difference ΔV1 between the voltage V1 for the first electrode 33B and the voltage V21 for the first area electrode 33B1 is controlled to be 0(V).

On the other hand, in this case, even though light is emitted from the region corresponding to the first area B1 of the image display section 20, the first polarized light (P-polarized light) passes through the first polarizer 31, but, since the first polarized light (P-polarized light) becomes the second polarized light (S-polarized light) in the process of passing through the liquid crystal layer 33A, the light is absorbed by the second polarizer 35, so that the light is basically not emitted from the vehicle mirror 1 to the outside.

However, since it is possible that light leaks to the second area B2 side in the vicinity of the first area B1 and the second area B2, the color liquid crystal display section is controlled so that, regarding the region of the image display section 20 corresponding to the first area B1, the display state is black so as not to output image light.

Note that, although the detailed explanation of the control for setting the voltage ΔV1 applied to the liquid crystal layer 33A in the region corresponding to the first area B1 to 0(V) is omitted since the control is the same as that of the above-explained whole mirror state, the region corresponding to the first area B1 simply functions as a mirror as in the case of the whole mirror state.

(Partial Anti-Glare Mirror State)

Since the second area B2 in the partial anti-glare mirror state is the same as in the partial mirror state, the explanation thereof is omitted.

On the other hand, as for the first area B1, it is necessary to perform the same control as explained in the whole anti-glare mirror state.

Therefore, the voltage ΔV1 applied to the part of the liquid crystal layer 33A corresponding to the region of the first area B1, that is, the voltage difference ΔV1 between the voltage V1 for the first electrode 33B and the voltage V21 for the first area electrode 33B1 is controlled according to the intensity of light from the headlight of a following vehicle, as explained in the whole anti-glare mirror state.

Note that, since how the control is performed is explained in detail in the whole anti-glare mirror state, the explanation thereof is omitted.

On the other hand, in this case, if light is emitted from the region of the image display section 20 corresponding to the first area B1, a part of the light becomes the second polarized light (S-polarized light) in the process of passing through the liquid crystal layer 33A but another part of the light remains the first polarized light (P-polarized light), and therefore, if light is emitted from the region of the image display section 20 corresponding to the first area B1, the light from the image display section 20 is emitted from the first area B1 to the outside of the vehicle mirror 1.

Therefore, the color liquid crystal display section is controlled so that, regarding the region of the image display section 20 corresponding to the first area B1, the display state is black so as not to output image light.

Accordingly, the light emitted from the first area B1 to the outside of the vehicle mirror 1 is only the outside light that entered the vehicle mirror 1 from the outside and was reflected by the first polarizer 31, so that the first area B1 functions as an anti-glare mirror.

(2-Screen Camera State)

In the 2-screen camera state, images (through-the-lens images) of the onboard camera C1 need to be displayed on the first area B1, and therefore, as with the second area B2, the voltage ΔV1 applied to the part of the liquid crystal layer 33A corresponding to the region of the first area B1 is controlled to be maximum.

That is, the voltage applied to the liquid crystal layer 33A is controlled to be the same as in the whole camera state.

Additionally, from the area of the image display section 20 corresponding to the first area B1, the image light corresponding to the images (through-the-lens images) of the onboard camera C1 is emitted toward the first polarizer 31, and the image light enters the vehicle mirror 1 from the outside from the first area B1, so that the images (through-the-lens images) of the onboard camera C1 are displayed on the first area B1.

FIG. 6 is a table summarizing the operation states of the present embodiment.

Note that images (through-the-lens images) of the onboard camera C2 to be displayed in the second area B2 show the vicinity of the vehicle, which is specifically the vicinity of the vehicle hidden below the rear window in the present example, and therefore the images are referred to as back-monitor display.

For this reason, in the table illustrated in FIG. 6, the back-monitor display is "OFF" in the cases of the whole mirror state, the whole anti-glare mirror state, and the whole camera state, and the back-monitor display is "ON (SECOND AREA B2)" in the cases of the partial mirror state, the partial anti-glare mirror state, and the 2-screen camera state.

In addition, the case of simply functioning as a mirror is described as MIRROR MODE, the case of functioning as an anti-glare mirror is described as ANTI-GLARE MODE, and the case of displaying images of a camera is described as CAMERA MODE, and, as shown in FIG. 6, the first area B1 and the second area B2 are controlled in the same way in the cases where the back-monitor display is "OFF".

On the other hand, in the cases where the back-monitor display is "ON (SECOND AREA B2)", the first area B1 is controlled in the same way as the cases where the back-monitor display is "OFF", but the second area B2 is always controlled so as to display images (through-the-lens images) of the onboard camera C2, that is, different controls are performed for the respective areas.

In this way, with such a configuration where appropriate control can be performed for a divided area, it is possible to reduce brightness change of an image even in a case where a through-the-lens image or the like, which is captured by a camera, etc., is displayed on a part of a mirror having an anti-glare function.

The above is a detailed explanation of the first embodiment, but, lastly, the method for controlling the voltage to be applied to the liquid crystal layer 33A is briefly described.

Figure 7:
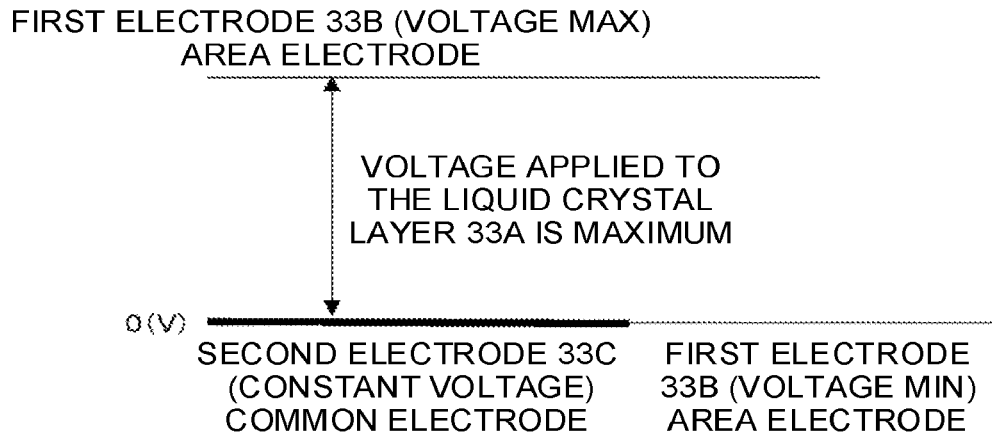
FIG. 7 is a diagram for explaining the first example of a method for controlling the voltage to be applied in the first embodiment.
Figure 8:
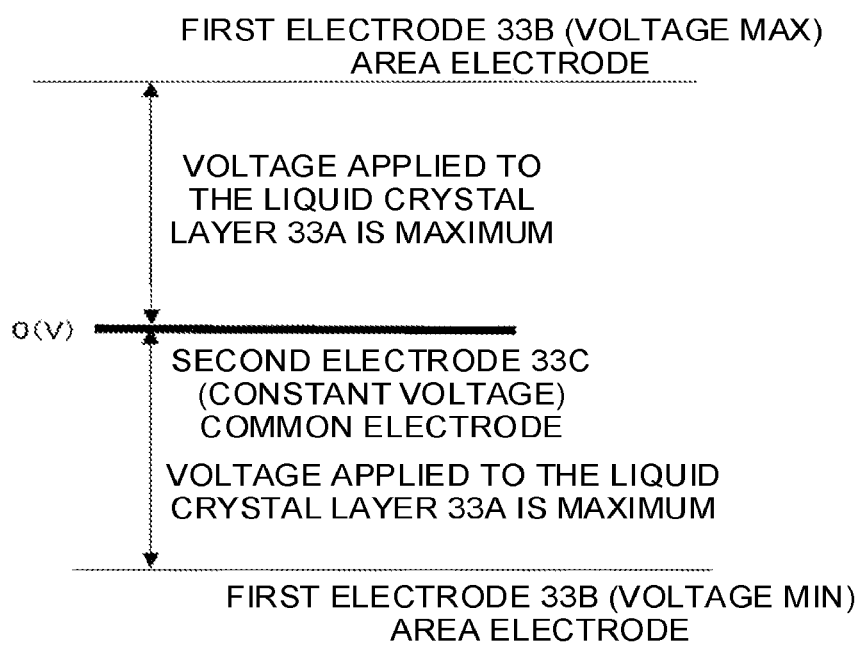
FIG. 8 is a diagram for explaining the second example of the method for controlling the voltage to be applied in the first embodiment.
Figure 9:
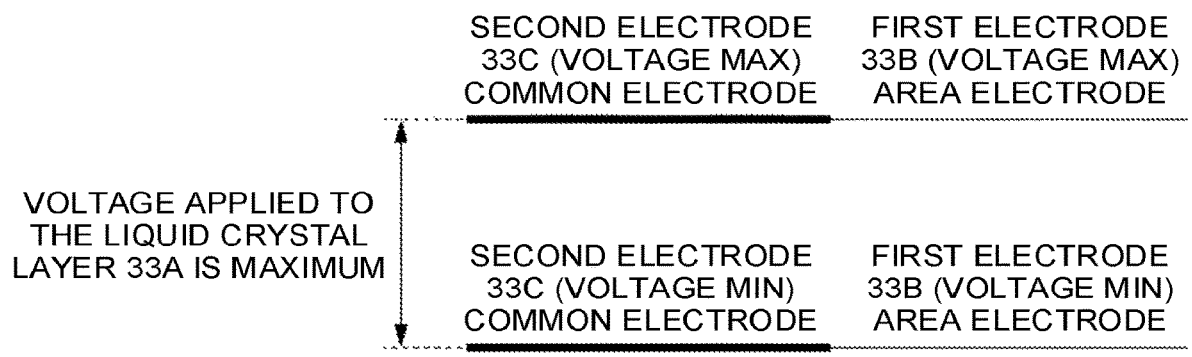
FIG. 9 is a diagram for explaining the third example of the method for controlling the voltage to be applied in the first embodiment.

FIG. 7 is a diagram for explaining the first example of the method for controlling the voltage to be applied in the present embodiment, FIG. 8 is a diagram for explaining the second example of the method for controlling the voltage to be applied in the present embodiment, and FIG. 9 is a diagram for explaining the third example of the method for controlling the voltage to be applied in the present embodiment.

As illustrated in FIG. 7, the first example is a method in which the second electrode 33C, which is a common electrode, is set to be constantly 0(V), and the first electrode 33B (the first area electrode 33B1 and the second area electrode 33B2), which is an area electrode, can be set to the minimum voltage, which is 0(V), and can be set to the maximum voltage, with which the maximum voltage is applied to the liquid crystal layer 33A, so that, by adjusting the voltage to be applied to the first electrode 33B (the first area electrode 33B1 and the second area electrode 33B2), the voltage to be applied to the liquid crystal layer 33A is controlled.

As illustrated in FIG. 8, the second example is a method in which the second electrode 33C, which is a common electrode, is set to be constantly 0(V), and the first electrode 33B (the first area electrode 33B1 and the second area electrode 33B2), which is an area electrode, can be set to the minimum voltage, with which the voltage that is largest in the minus side is applied to the liquid crystal layer 33A, and can be set to the maximum voltage, with which the voltage that is largest in the plus side is applied to the liquid crystal layer 33A, so that, by appropriately adjusting the voltage to be applied to the first electrode 33B (the first area electrode 33B1 and the second area electrode 33B2) to the plus side and to the minus side, the voltage to be applied to the liquid crystal layer 33A is controlled.

As illustrated in FIG. 9, the third example is a method in which the voltage to be applied to the second electrode 33C, which is a common electrode, can be adjusted within a given range (for example, a range from 0(V) to 5(V)), and the voltage to be applied to the first electrode 33B (the first area electrode 33B1 and the second area electrode 33B2), which is an area electrode, can also be adjusted within a given range (for example, a range from 0(V) to 5(V)), so that, by adjusting these voltages, the voltage to be applied to the liquid crystal layer 33A is controlled.

Although application of a voltage to the liquid crystal layer 33A as described above can be performed in any of the controlling methods of the first example through the third example, for example, as in the third example, in a case where the control of changing a voltage is performed for both of the common electrode (electrode of the second electrode 33C) and the area electrode (electrode of the first electrode 33B), it is possible to prevent burn-in of liquid crystal molecules since the voltage to be applied to each electrode can be kept low and the control for inverting the polarity of liquid crystal molecules can be easily performed.

Second Embodiment

Next, an explanation is given of the vehicle mirror 1 of the second embodiment.

Figure 10:
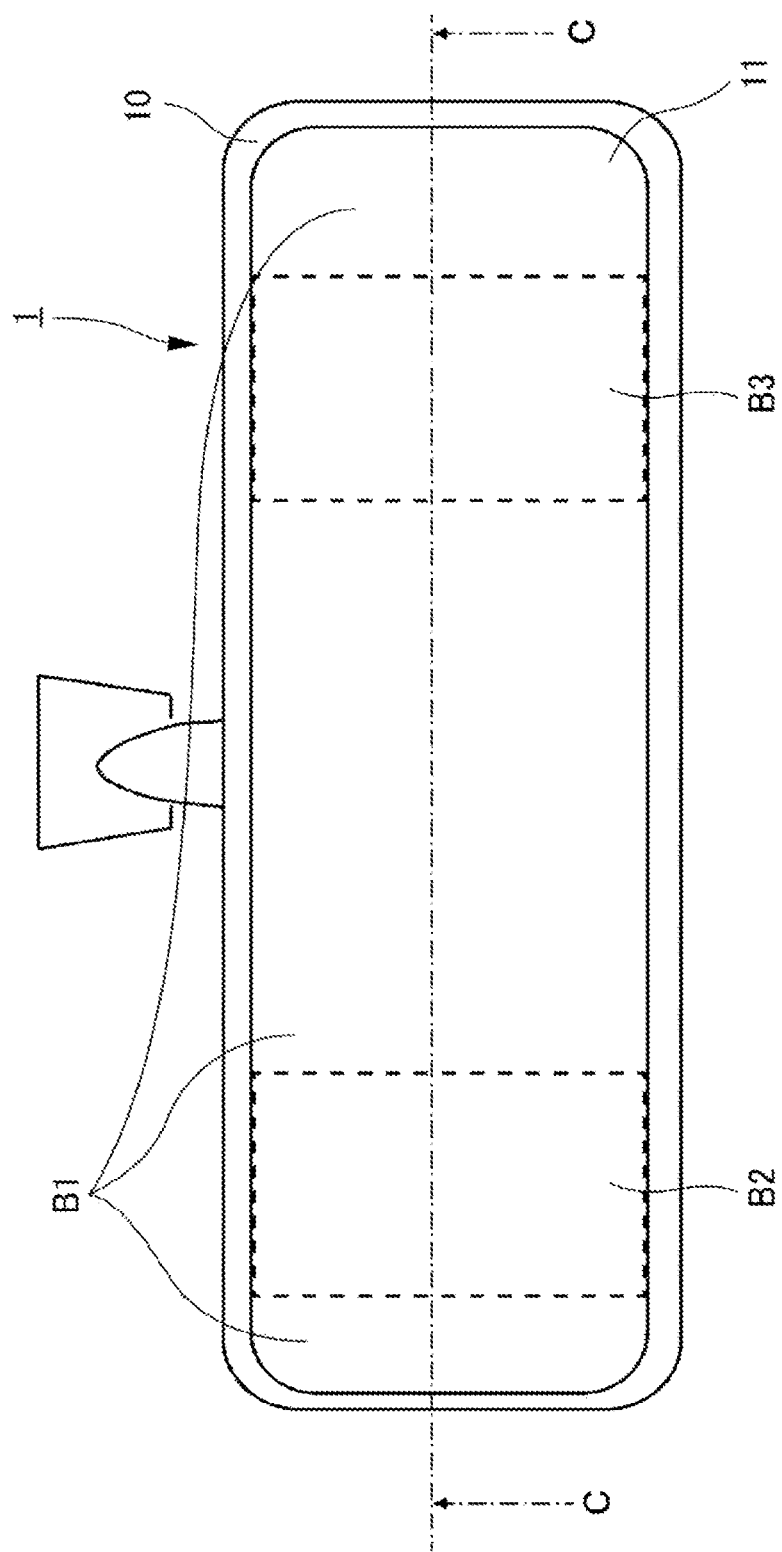
FIG. 10 is a plan view of a vehicle mirror of the second embodiment.
Figure 11:
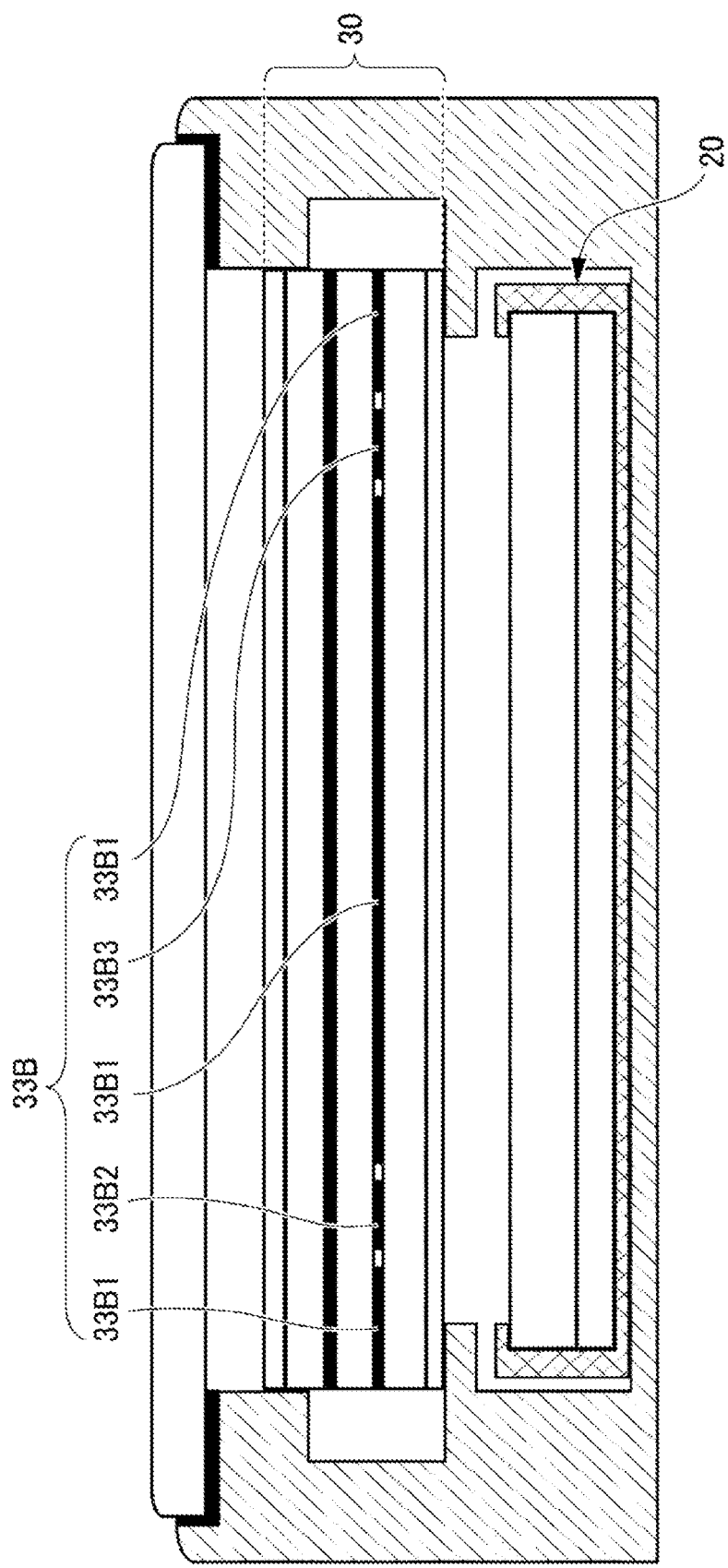
FIG. 11 is a schematic view illustrating the cross section taken along Line C-C of FIG. 10.

FIG. 10 is a plan view of the vehicle mirror 1 of the second embodiment, and FIG. 11 is a schematic view illustrating the cross section taken along Line C-C of FIG. 10.

Since the basic configuration of the second embodiment is the same as that of the first embodiment, the different parts are mainly explained in the following description, and explanations of the same aspects may be omitted.

As illustrated in FIG. 10, the second embodiment is different in the aspect that the third area B3 is additionally provided.

It is expected that some drivers desire to display images (through-the-lens images) of the onboard camera C2 at a right-side position, not a left-side position, of the vehicle mirror 1, and, furthermore, there may be a case in which it is desired to change the position for displaying images (through-the-lens images) of the onboard camera C2 to a left-side position or a right-side position of the vehicle mirror 1, depending on a left-hand drive car or a right-hand drive car.

In the second embodiment, the third area B3 is provided to meet such a need.

Therefore, as illustrated in FIG. 11, there is such a change that the first electrode 33B is formed with three area electrodes, that is, the first area electrode 33B1 that is set for the region corresponding to the first area B1, the second area electrode 33B2 that is set for the region corresponding to the second area B2, and the third area electrode 33B3 that is set for the region corresponding to the third area B3, and the other aspects are the same as those of the first embodiment.

FIG. 12 is a table summarizing the operation states of the present embodiment and corresponding to the table illustrated in FIG. 6.

As illustrated in FIG. 12, in a case where the second area B2 is ON and it is selected to display images (through-the-lens images) of the onboard camera C2 on the second area B2, the third area B3 is configured to operate in the same way as the first area B1.

On the other hand, in a case where the third area B3 is ON and it is selected to display images (through-the-lens images) of the onboard camera C2 on the third area B3, the operation of the second area B2 explained in the first embodiment is performed on the third area B3, and the second area B2 is configured to operate in the same way as the first area B1.

Note that, needless to say, although the second area B2 and the third area B3 are provided such that the position for displaying images (through-the-lens images) of the onboard camera C2 can be selected in the present embodiment, it is also possible that, for example, an onboard camera C3 is mounted on the vehicle, so that the third area B3 is used as the region for displaying images (through-the-lens images) of the onboard camera C3.

Third Embodiment

Next, an explanation is given of the vehicle mirror 1 of the third embodiment.

Since the configuration of the third embodiment is also the same as that of the first embodiment in many aspects, the different aspects are mainly explained in the following description, and explanations of the same aspects may be omitted.

Figure 13:
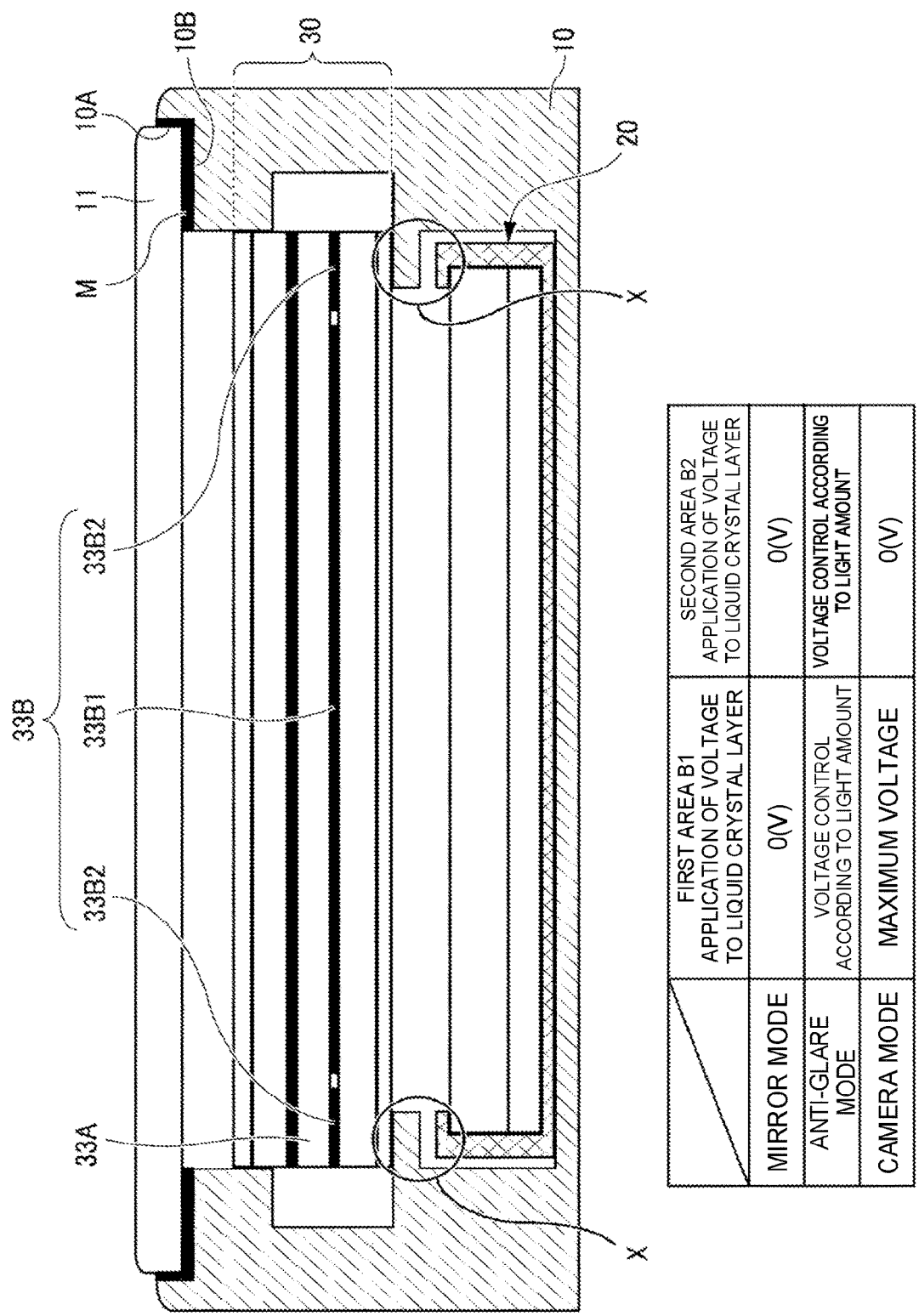
FIG. 13 is a diagram for explaining a vehicle mirror of the third embodiment.

FIG. 13 is a diagram for explaining the vehicle mirror 1 of the third embodiment and is a diagram corresponding to FIG. 3 and FIG. 11 explained above.

For example, in the vehicle mirror 1, it is preferable that the range that can be used as a mirror is as wide as possible.

However, the housing 10 includes a receiver section 10B which is provided so as to block the opening 10A, that is, so as to protrude inward along the opening 10A for receiving the cover 11, and the part corresponding to the receiver section 10B cannot be used as a mirror by the operation of the mirror section 30 explained in the above description.

Therefore, as mentioned earlier, the mirror finish is applied to the surface of the receiver section 10B at the part (also referred to as a contact section) of the cover 11 to be received by the receiver section 10B, so that the fixed mirror section M that always functions as a mirror is formed.

On the other hand, the portion X illustrated in FIG. 13 is not visible from the outside of the vehicle mirror 1 in a case where the mirror section 30 is simply functioning as a mirror and a case where the mirror section 30 is functioning as an anti-glare mirror.

However, in a case where the mirror section 30 is controlled to function in a camera mode, the portion X becomes visible from the outside of the vehicle mirror 1, so that a small linear frame that causes a feeling of strangeness will appear between the fixed mirror section M and the image display section 20.

Therefore, although the case in which the first electrode 33B is formed with multiple area electrodes in order to create a region for displaying images (through-the-lens images) of the onboard camera C2 has been explained so far, in the third embodiment, an explanation is given of a method for preventing the small linear frame that causes a feeling of strangeness from appearing to improve the appearance, by use of the configuration in which the first electrode 33B is formed with multiple area electrodes.

Specifically, the first electrode 33B includes the first area electrode 33B1 that is formed in the region corresponding to the first area B1 of the first electrode 33B, so that, in the same manner as described above, application of a voltage for performing the same control as described above (the mirror mode, the anti-glare mode, and the camera mode) can be performed to the liquid crystal layer 33A corresponding to the first area B1 on which images (through-the-lens images) of the onboard camera C1 are displayed.

On the other hand, the present embodiment is different in the aspect that only the onboard camera C1 is mounted and the onboard camera C2 is not mounted on the vehicle, but, as for the first electrode 33B, the region corresponding to the part X indicated in FIG. 13 is designed to be the second area B2, and the first electrode 33B includes the second area electrode 33B2 that is formed in the region corresponding to the second area B2 of the first electrode 33B, so that it is possible to control the voltage to be applied to the liquid crystal layer 33A corresponding to the second area B2.

Furthermore, as can be seen in the application states of the voltages for the liquid crystal layer 33A corresponding to the first area B1 and the second area B2, which are indicated in the table on the lower side of FIG. 13, the control of a voltage to be applied is the same for the liquid crystal layer 33A corresponding to any of the first area electrode 33B1 and the second area electrode 33B2 in the mirror mode and the anti-glare mode, but, in the camera mode, although the same voltage application control as in the mirror mode is performed for the liquid crystal layer 33A corresponding to the second area electrode 33B2, the control to apply the maximum voltage is performed for the liquid crystal layer 33A corresponding to the first area electrode 33B1.

Accordingly, in the camera mode, since the second area B2, that is, the region between the fixed mirror section M and the image display section 20 is controlled to be in a state of a simple mirror, a small linear frame that causes a feeling of strangeness is prevented from appearing.

However, the second area B2 is not always controlled to be in a simple mirror, and therefore, in a case where the first area B1 is in an anti-glare mode, the second area B2 is driven in an anti-glare mode as well, so that the region to become the anti-glare mode can be widely acquired.

Note that, needless to say, in the third embodiment, it is also possible that the onboard camera C2 is mounted on the vehicle as in the first embodiment and the second embodiment, so as to add an area for displaying images (through-the-lens images) of the onboard camera C2.

Needless to say, conversely, the configuration of the third embodiment can be applied to the first embodiment and the second embodiment.

Although the specific embodiments are explained above, the present invention is not limited to the above-described embodiments, and ones with modifications and improvements without departing from the technical idea may be included in the technical scope of the invention.

For example, although the case where the image display section 20 is a liquid crystal display device is explained in the above-described embodiments, there is no such limitation to the embodiments, and the image display section 20 only needs to be a display device that displays an image with first polarized light.

Furthermore, in the above-described embodiments, the first polarizer 31 reflects the first polarized light and transmits the second polarized light, and the second polarizer 35 transmits the first polarized light and absorbs the second polarized light.

However, it is also possible that the first polarizer 31 reflects the second polarized light and transmits the first polarized light, and the second polarizer 35 transmits the first polarized light and absorbs the second polarized light.

Thus, even though the first polarizer 31 is configured to reflect the second polarized light and transmit the first polarized light, it is possible to realize the same operation as explained in the above description as long as the initial setting of the alignment direction of liquid crystal molecules of the liquid crystal layer 32A is appropriately changed.

Therefore, the first polarizer 31 only needs to be configured to reflect at least one of the first polarized light and the second polarized light and transmit the other light.

In this way, the present invention need not be limited to the specific embodiments, which is obvious to those skilled in the art, based on the description of the claims.

DESCRIPTION OF REFERENCE NUMERALS 1 vehicle mirror
10 housing 10A opening
10B receiver section
11 cover
20 image display section
21 case
21A opening
22 control board
23 liquid crystal monitor
30 mirror section
31 first polarizer
32 glass substrate
33 polarization controller
33A liquid crystal layer
33B first electrode
33B1 first area electrode
33B2 second area electrode
33B3 third area electrode
33C second electrode
34 glass substrate
35 second polarizer
B1 first area
B2 second area
B3 third area
M fixed mirror section

The invention claimed is:

1. A vehicle mirror capable of displaying an image, the vehicle mirror comprising:
an image display section configured to display an image with first polarized light; and
a mirror section disposed on an image output side of the image display section,
wherein, in order from a side of the image display section, the mirror section includes
a first polarizer configured to transmit at least one of the first polarized light and second polarized light and reflect the other light,
a polarization controller configured to control a polarization state of light, and
a second polarizer configured to transmit the first polarized light and absorb the second polarized light,
wherein the polarization controller includes
a liquid crystal layer,
a first electrode that is set on a first polarizer side of the liquid crystal layer, and
a second electrode that is set on a second polarizer side of the liquid crystal layer,
wherein at least one of the first electrode and the second electrode is formed with a plurality of area electrodes including at least a first area electrode and a second area electrode, and
wherein the image display section includes a controller that controls the image display section and the mirror section by using the polarization controller such that the vehicle mirror is operable between a plurality of operation states including a mirror state and a camera state, the camera state including an operation state in which the image display section corresponding to the first area electrode is turned on to display an image from a first camera and the image display section corresponding to the second area electrode is turned on to display an image from a second camera different from the first camera.

2. The vehicle mirror according to claim 1, wherein the one of the first electrode and the second electrode that is not formed with the area electrodes is formed with one common electrode.

3. The vehicle mirror according to claim 2, wherein control for changing a voltage is performed for both of the common electrode and the area electrodes.

4. The vehicle mirror according to claim 2, wherein a fixed voltage is set for the common electrode, and control for separately changing voltages for the area electrodes is performed.

5. The vehicle mirror according to claim 1, wherein the one of the first electrode and the second electrode that is not formed with the area electrodes is formed with a plurality of common electrodes.

6. The vehicle mirror according to claim 1,
wherein the first polarized light is P-polarized light,
wherein the second polarized light is S-polarized light, and
wherein the image display section is a liquid crystal display device.

7. The vehicle mirror according to claim 1,
wherein a plurality of the operation states include, as the mirror state and the camera state, a whole mirror state, a whole anti-glare mirror state, a whole camera state, a partial mirror state, a partial anti-glare mirror state, and a two-screen camera state, and
wherein the controller controls the image display section and the mirror section such that in the whole mirror state, zero voltage is applied to both the liquid crystal layer corresponding to the first area electrode and the liquid crystal layer corresponding to the second area electrode, and the image display section corresponding to the first area electrode and the image display section corresponding to the second area electrode are both turned off,
wherein in the whole camera state, a predetermined maximum voltage is applied to both the liquid crystal layer corresponding to the first area electrode and the liquid crystal layer corresponding to the second area electrode, and the image display section corresponding to the first area electrode and the image display section corresponding to the second area electrode are both turned on to display an image from a first camera,
wherein in the whole anti-glare mirror state, an anti-glare voltage greater than zero and less than the predetermined maximum voltage applied to both the liquid crystal layer corresponding to the first area electrode and the liquid crystal layer corresponding to the second area electrode, and the image display section corresponding to the first area electrode and the image display section corresponding to the second area electrode are both turned off,
wherein in the partial mirror state, zero voltage is applied to the liquid crystal layer corresponding to the first area electrode, the image display section corresponding to the first area electrode is turned off, the predetermined maximum voltage is applied to the liquid crystal layer corresponding to the second area electrode, and the image display section corresponding to the second area electrode is turned on to display an image from a second camera,
wherein in the partial anti-glare mirror state, the anti-glare voltage is applied to the liquid crystal layer corresponding to the first area electrode, the image display section corresponding to the first area electrode is turned off, the predetermined maximum voltage is applied to the liquid crystal layer corresponding to the second area electrode, and the image display section corresponding to the second area electrode is turned on to display the image from the second camera, and wherein in the two-screen camera state, the predetermined maximum voltage is applied to both the liquid crystal layer corresponding to the first area electrode and the liquid crystal layer corresponding to the second area electrode, the image display section corresponding to the first area electrode is turned on to display the image from the first camera, the predetermined maximum voltage is applied to the liquid crystal layer corresponding to the second area electrode, and the image display section corresponding to the second area electrode is turned on to display the image from the second camera.

8. A vehicle mirror capable of displaying an image, the vehicle mirror comprising:

an image display section configured to display an image with first polarized light; and a mirror section disposed on an image output side of the image display section, wherein, in order from a side of the image display section, the mirror section includes a first polarizer configured to transmit at least one of the first polarized light and second polarized light and reflect the other light, a polarization controller configured to control a polarization state of light, and a second polarizer configured to transmit the first polarized light and absorb the second polarized light, wherein the polarization controller includes a liquid crystal layer, a first electrode that is set on a first polarizer side of the liquid crystal layer, and a second electrode that is set on a second polarizer side of the liquid crystal layer, wherein at least one of the first electrode and the second electrode is formed with a plurality of area electrodes including a first area electrode and a second area electrode, wherein the vehicle mirror is operable between a whole mirror state, a whole anti-glare mirror state, a whole camera state, a partial mirror state, a partial anti-glare mirror state, and a two-screen camera state, wherein in the whole mirror state, zero voltage is applied to both the liquid crystal layer corresponding to the first area electrode and the liquid crystal layer corresponding to the second area electrode, and the image display section corresponding to the first area electrode and the image display section corresponding to the second area electrode are both turned off, wherein in the whole camera state, a predetermined maximum voltage is applied to both the liquid crystal layer corresponding to the first area electrode and the liquid crystal layer corresponding to the second area electrode, and the image display section corresponding to the first area electrode and the image display section corresponding to the second area electrode are both turned on to display an image from a first camera, wherein in the whole anti-glare mirror state, an anti-glare voltage greater than zero and less than the predetermined maximum voltage applied to both the liquid crystal layer corresponding to the first area electrode and the liquid crystal layer corresponding to the second area electrode, and the image display section corresponding to the first area electrode and the image display section corresponding to the second area electrode are both turned off, wherein in the partial mirror state, zero voltage is applied to the liquid crystal layer corresponding to the first area electrode, the image display section corresponding to the first area electrode is turned off, the predetermined maximum voltage is applied to the liquid crystal layer corresponding to the second area electrode, and the image display section corresponding to the second area electrode is turned on to display an image from a second camera, wherein in the partial anti-glare mirror state, the anti-glare voltage is applied to the liquid crystal layer corresponding to the first area electrode, the image display section corresponding to the first area electrode is turned off, the predetermined maximum voltage is applied to the liquid crystal layer corresponding to the second area electrode, and the image display section corresponding to the second area electrode is turned on to display the image from the second camera, and wherein in the two-screen camera state, the predetermined maximum voltage is applied to both the liquid crystal layer corresponding to the first area electrode and the liquid crystal layer corresponding to the second area electrode, the image display section corresponding to the first area electrode is turned on to display the image from the first camera, the predetermined maximum voltage is applied to the liquid crystal layer corresponding to the second area electrode, and the image display section corresponding to the second area electrode is turned on to display the image from the second camera.

* * * * *